June 1, 1965 B. D. LUMMIS 3,187,110
RING TONE FEEDBACK CIRCUIT
Filed April 2, 1962
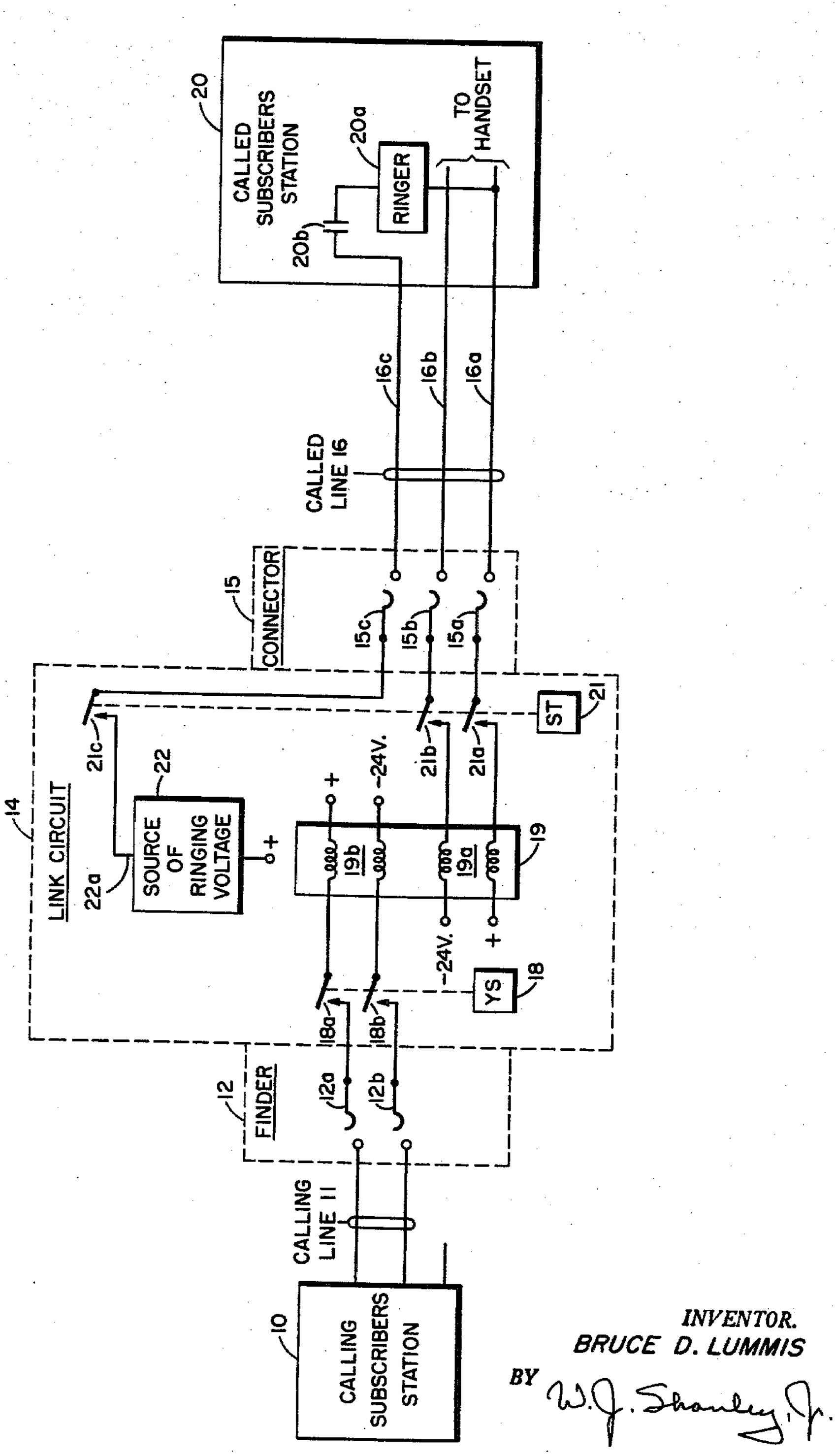
INVENTOR.
BRUCE D. LUMMIS
BY W. J. Shanley, Jr.
ATTORNEY United States Patent Office 3,187,110
Patented June 1, 1965

3,187,110
RING TONE FEEDBACK CIRCUIT
Bruce D. Lummis, Pine Beach, N.J., assignor to General Dynamics Corporation, Rochester, N.Y., a corporation of Delaware
Filed Apr. 2, 1962, Ser. No. 184,067
6 Claims. (Cl. 179—89)

This invention relates to a ring tone feedback circuit and, more particularly, to a ring tone feedback circuit in which ring tone is fed back to the calling party only when a subscriber station with ringer is connected to the called line.

In telephone switchboards, ring tone feedback circuits are provided to feed back ring tone to the calling party in order to indicate that the called party is being rung and give a ring tone indication to the calling party that the phone is being rung. The calling party hears a ring tone even though the called line is dead because there is no telephone instrument on the called line or the line is disconnected. This problem is especially significant in private branch exchanges where phone numbers are constantly being changed, lines are being disconnected, and telephone instruments moved. Consequently, in such a system it is highly desirable that the calling party be able to rely upon the ring tone being fed back to give an accurate indication of whether ringing is actually taking place at the location of the called line instead of wasting his time by holding during the period when he presumes that he is ringing the called phone. It would be highly desirable to immediately inform the calling party that ringing is not taking place on the called phone.

It is, therefore, an object of my invention to provide a new and improved ring tone feedback circuit which does not give the false indication of ringing when calling a dead line.

It is a further object of my invention to provide a new and improved ring tone feedback circuit to overcome the problem of ring tone being fed back to the calling party when dead lines are dialed without utilizing complicated line blocking control circuits.

In accordance with my invention, ringing voltage is applied to the ringer of the called subscriber station over a series circuit, a portion of which includes a portion of the talking (audio signal) path extending between the calling and called subscriber stations.

Furter objects and advantages of my invention will become apparent as the following descripiton proceeds, and the features of novelty which characterize my invention will be pointed out with particularity in the claims annexed to and forming a part of this specification.

For a better understanding of my invention, reference may be had to the accompanying drawing the sole figure of which is a schematic diagram of a preferred embodiment of my invention.

Referring more particularly to the drawing, calling subscriber station 10 is connected to called subscriber station 20 via calling line 11, finder 12, link circuit 14, connector 15, and called line 16. The details of the manner in which the finder and connector are controlled in response to the calling subscriber station going off-hook and transmitting switch directing signals will not be discussed since they form no part of my invention. When calling subscriber station 10 goes off-hook, finder 12 operates, in a manner well known in the art, to find calling line 11 and, in response to finding this line, YS relay 18 is operated to extend a talking path from winding 19*b* of audio transformer 19 of the link circuit, over operated make contacts 18*a* and 18*b* of YS relay 18, wipers 12*a* and 12*b* of finder 12, and calilng line 11 to subscriber station 10.

Thereafter, in response to switch directing signals emanating from the calling subscriber station 10, connector 15 is controlled in a manner well known in the art to step wipers 15*a*, 15*b* and 15*c* to the terminals associated with called line 16. Means is provided for performing a busy test of the called line (not shown), in response to the extension of a connection to called line 16 when wipers 15*a*–16*c* complete their movement to the terminals associated with called line 16, and ST relay 21 is operated in a manner well known in the art in response to the busy test showing the called subscriber station to be idle. Operation of ST relay 21 switches through or completes the prepared talking path by extending it from audio transformer 19 through contacts 21*a* and 21*b* of ST relay 21, wipers 15*a* and 15*b*, and conductors 16*a* and 16*b* of called line 16 to subscriber station 20. Thus, contacts 21*a* and 21*b* provide means operable in response to the extension of a connection to a called line which is idle for completing a talking path from the calling line to subscriber station 20 over called line 16.

Source of ringing voltage 22, one side of which is connected to positive ground, is connected across ringer 20*a* over a circuit traced from terminal 22*a*, contact 21*c*, wiper 15*c*, conductor 16*c*, capacitor 20*b* to one terminal of ringer 20*a*. The other terminal of ringer 20*a* is returned to positive ground over the portion of the audio path traversing conductor 16*a*, wiper 15*a*, switching means 21*a*, one-half of winding 19*a* of transformer 19, to positive ground. Thus, it may be seen that the ground return path for the ringing voltage applied over conductor 16*c* to ringer 20*a* includes a portion of the talking path between transformer 19 and subscriber station 20. Consequently, upon the operation of ST relay 21, the audio path that is already completed from subscriber station 10 to winding 19*b* of transformer 19 is further extended from winding 19*a* to called subscriber station 20 over contacts 21*a* and 21*b*. At the same time, contact 21*c* is operated, applying ringing voltage across ringer 20*a* over one side of the audio path extending from transformer 19 to called subscriber station 20. This ringing current flowing through a portion of winding 19*a* induces a ring tone in winding 19*b* which is fed back to calling subscriber station 10.

It will be recognized that if there is no ringer connected between conductors 16*c* and 16*a*, or the ringing circuit is open at any point, ringing current will not be passing through winding 19*a* and, consequently, no ring tone can be induced in winding 19*b* and therefore no ring tone can be fed back to the calling subscriber station. Therefore, if no ring tone is heard by the calling subscriber, he can be assured that the called phone is not ringing.

While I have shown and described a specific embodiment of my invention, other modifications will readily occur to those skilled in the art. I do not, therefore, desire my invention to be limited to the specific arrangement shown and described, and I intend in the appended claims to cover all modifications which fall within the spirit and scope of my invention.

What I claim is:

1. In a telephone system, a ring tone feedback circuit for feeding back ring tone to a calling line comprising, a calling line, a called line, a subscriber station connected to said called line, said subscriber station having a ringer, a source of ringing voltage, a talking path including said called and calling lines, means operable for completing said talking path from said calling line to said called line, means operable for connecting said source of ringing voltage across said ringer over that portion of said talking path which includes said called line when said talking path is completed so that a ringing signal is placed on said talking path and thus is fed back to said calling line only when a subscriber station with ringer is connected to said called line, and means for operating said completing means and said connecting means in response to the extension of a connection to said called line when said called line is idle.

2. The combination of claim 1 in which said called line comprises first and second conductors serving as portions of said talking path, and a third conductor, said connecting means comprises first switching means operable for connecting one terminal of said source of ringing voltage to one end of said third conductor, the other end of which is connected to one terminal of said ringer, said completing means comprises second switching means operable for connecting the other terminal of said source to the other terminal of said ringer over said first conductor, both of said switching means being operable under control of said operating means.

3. The combination of claim 2 in which said completing means further comprises third switching means operable for completing said talking path between said calling and said subscriber station over said second conductor, said third switching means being operable under control of said operating means.

4. The combination of claim 3 in which the portion of talking path between said calling and called lines includes means for inductively coupling said calling and called lines.

5. The combination of claim 4 in which said talking path further comprises a battery connected to provide talking current for the portion of said talking path between said inductive coupling means and said subscriber station, one side of said battery being connected in common with said other side of said source of ringing current.

6. In a telephone system having balanced two-conductor lines for providing a talking path between calling and called subscriber stations and a third conductor for applying ringing voltage to said subscriber stations, the improvement comprising, a source of ringing voltage, means for selectively connecting one terminal of said source to one terminal of the ringer of a called subscriber station over said third conductor, the other terminal of said ringer being connected to the other terminal of said source over one side of said balanced line to thereby apply to said talking path for return to a calling subscriber station a ring tone signal proportional to ring current through said ringer.

References Cited by the Examiner

UNITED STATES PATENTS

| | | | |
|---|---|---|---|
| 1,501,694 | 7/24 | Wohlers | 179—89 |
| 1,628,358 | 5/27 | Friendly | 179—18 |
| 1,807,968 | 6/31 | Crocker | 179—84 |
| 2,057,898 | 10/36 | Kruse et al. | 179—89 |
| 2,691,069 | 10/54 | Frankel | 179—27 |
| 2,715,161 | 8/55 | Lutz et al. | 179—84 |
| 2,816,170 | 12/57 | Gatzert | 179—17 |

ROBERT H. ROSE, *Primary Examiner.*

WALTER L. LYNDE, *Examiner.*